US012756915B2

(12) United States Patent
Zhou et al.

(10) Patent No.: US 12,756,915 B2
(45) Date of Patent: Oct. 6, 2026

(54) CAMERA MODULE AND ELECTRONIC DEVICE

(71) Applicant: VIVO MOBILE COMMUNICATION CO., LTD., Guangdong (CN)

(72) Inventors: Shuaiyu Zhou, Guangdong (CN); Zhengjun Luo, Guangdong (CN); Guanglong Chen, Guangdong (CN); Haiming Lin, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 250 days.

(21) Appl. No.: 18/614,697

(22) Filed: Mar. 24, 2024

(65) Prior Publication Data

US 2024/0236463 A1 Jul. 11, 2024

Related U.S. Application Data

(63) Continuation of application No. PCT/CN2022/119556, filed on Sep. 19, 2022.

(30) Foreign Application Priority Data

Sep. 24, 2021 (CN) ......................... 202111122555.X

(51) Int. Cl.

*H04N 23/55* (2023.01)
*G02B 7/08* (2021.01)
*H04N 23/57* (2023.01)
*H04N 23/69* (2023.01)

(52) U.S. Cl.

CPC ............... *H04N 23/55* (2023.01); *G02B 7/08* (2013.01); *H04N 23/57* (2023.01); *H04N 23/69* (2023.01)

(58) Field of Classification Search

CPC ........ H04N 23/55; H04N 23/57; H04N 23/69; G02B 7/08; G03B 2205/0069; G03B 3/10; G03B 5/00; G03B 30/00

(Continued)

(56) References Cited

U.S. PATENT DOCUMENTS

2008/0310034 A1 12/2008 Huang
2009/0268309 A1 10/2009 Ke (Continued)

FOREIGN PATENT DOCUMENTS

CN 101196600 A 6/2008
CN 101566714 A 10/2009

(Continued)

OTHER PUBLICATIONS

Extended European Search Report for Application No. 22871900.1, dated Dec. 10, 2024, 8 Pages.

(Continued)

*Primary Examiner* — Mohammed A Hasan
(74) *Attorney, Agent, or Firm* — BROOKS KUSHMAN P.C.

(57) ABSTRACT

A camera module and an electronic device. The camera module includes a base, a photosensitive chip, a first lens barrel, a first lens, a second lens, an active lens barrel, a first bracket, a first driving mechanism, and a second driving mechanism, where the photosensitive chip is arranged on the base, the active lens barrel is rotatably connected to the base, the first lens barrel is sleeved on the active lens barrel, the first lens barrel is connected to the active lens barrel through a first fitting convex portion and a first spiral guide groove, the first bracket is movably arranged on the base, the first lens is arranged on the first lens barrel, the second lens is arranged on the first bracket, and the second lens is located between the photosensitive chip and the first lens.

18 Claims, 8 Drawing Sheets

(58) Field of Classification Search
USPC .......................................................... 359/823
See application file for complete search history.

(56) References Cited

U.S. PATENT DOCUMENTS

| | | | | |
|---|---|---|---|---|
| 2011/0007202 | A1* | 1/2011 | Chiang | G02B 7/102 348/E5.042 |
| 2019/0361153 | A1* | 11/2019 | Wang | G02B 7/026 |
| 2020/0007729 | A1* | 1/2020 | Ha | H04N 23/55 |
| 2022/0075240 | A1* | 3/2022 | Shin | G03B 30/00 |
| 2023/0064564 | A1* | 3/2023 | Lee | H01F 7/081 |
| 2023/0350159 | A1* | 11/2023 | Wang | G02B 7/102 |
| 2024/0094602 | A1* | 3/2024 | Ye | G03B 5/02 |

FOREIGN PATENT DOCUMENTS

| | | | |
|---|---|---|---|
| CN | 109995919 | A | 7/2019 |
| CN | 110505370 | A | 11/2019 |
| CN | 111147721 | A | 5/2020 |
| CN | 112526700 | A | 3/2021 |
| CN | 112637461 | A | 4/2021 |
| CN | 112689075 | A | 4/2021 |
| CN | 112929529 | A | 6/2021 |
| CN | 112954164 | A | 6/2021 |
| CN | 113109985 | A | 7/2021 |
| JP | S61175605 | A | 8/1986 |
| JP | 2008112016 | A | 5/2008 |
| WO | 2021143410 | A1 | 7/2021 |

OTHER PUBLICATIONS

International Search Report and Written Opinion for Application No. PCT/CN2022/119556, dated Dec. 8, 2022, 13 Pages.
First Chinese Office Action for Chinese Patent Application No. 202111122555.X mailed Apr. 1, 2025. 23 pages.

* cited by examiner

CAMERA MODULE AND ELECTRONIC DEVICE

CROSS-REFERENCE TO RELATED APPLICATIONS

This application is a continuation of International Application No. PCT/CN2022/119556 filed on Sep. 19, 2022, which claims priority to Chinese Patent application No. 20/2111122555.X filed on Sep. 24, 2021, which are incorporated herein by reference in their entireties.

TECHNICAL FIELD

This application belongs to the field of photographing technologies, and specifically, to a camera module and an electronic device.

BACKGROUND

Nowadays, as photographing technologies of electronic devices continues to improve, people hope to shoot an image with higher quality by using the electronic device.

In an actual shooting process, a to-be-photographed object may be enlarged through optical zoom. The optical zoom may enlarge the to-be-photographed object by changing a distance between a lens and the to-be-photographed object Therefore, the lens needs to move in a zooming process. To implement the movement of the lens, a fitting protrusion may be arranged on one lens barrel, and a sliding groove may be provided on the other lens barrel. The fitting protrusion slide-fits the sliding groove, to implement relative movement between the two lens barrels, and ultimately implement the movement of the lens.

However, to make a zoom range of a camera module greater, usually a multi-level telescopic structure needs to be designed. There are complex sleeve relationships in telescopic structures at all levels. This results in relatively complex connection structures of the telescopic structures at all levels. Therefore, there is a great difficulty in structural design of a conventional camera module.

SUMMARY

An objective of embodiments of this application is to provide a camera module and an electronic device.

This application is implemented as follows:

According to a first aspect, embodiments of this application provide a camera module, including a base, a photosensitive chip, a first lens barrel, a first lens, a second lens, an active lens barrel, a first bracket, a first driving mechanism, and a second driving mechanism, where the photosensitive chip is arranged on the base, the active lens barrel is rotatably connected to the base, the first lens barrel is sleeved on the active lens barrel, the first lens barrel is connected to the active lens barrel through a first fitting convex portion and a first spiral guide groove, the first bracket is movably arranged on the base, the first lens is arranged on the first lens barrel, the second lens is arranged on the first bracket, and the second lens is located between the photosensitive chip and the first lens, and the first driving mechanism is connected to the active lens barrel, the first driving mechanism drives, through the active lens barrel, the first lens barrel to move in a first direction through fitting between the first fitting convex portion and the first spiral guide groove, the second driving mechanism is connected to the first bracket, the second driving mechanism drives the first bracket to move in the first direction, and the first direction is a direction close to or away from the photosensitive chip.

According to a second aspect, embodiments of this application provide an electronic device, including the camera module.

DESCRIPTIONS OF REFERENCE NUMERALS

Figure 1:
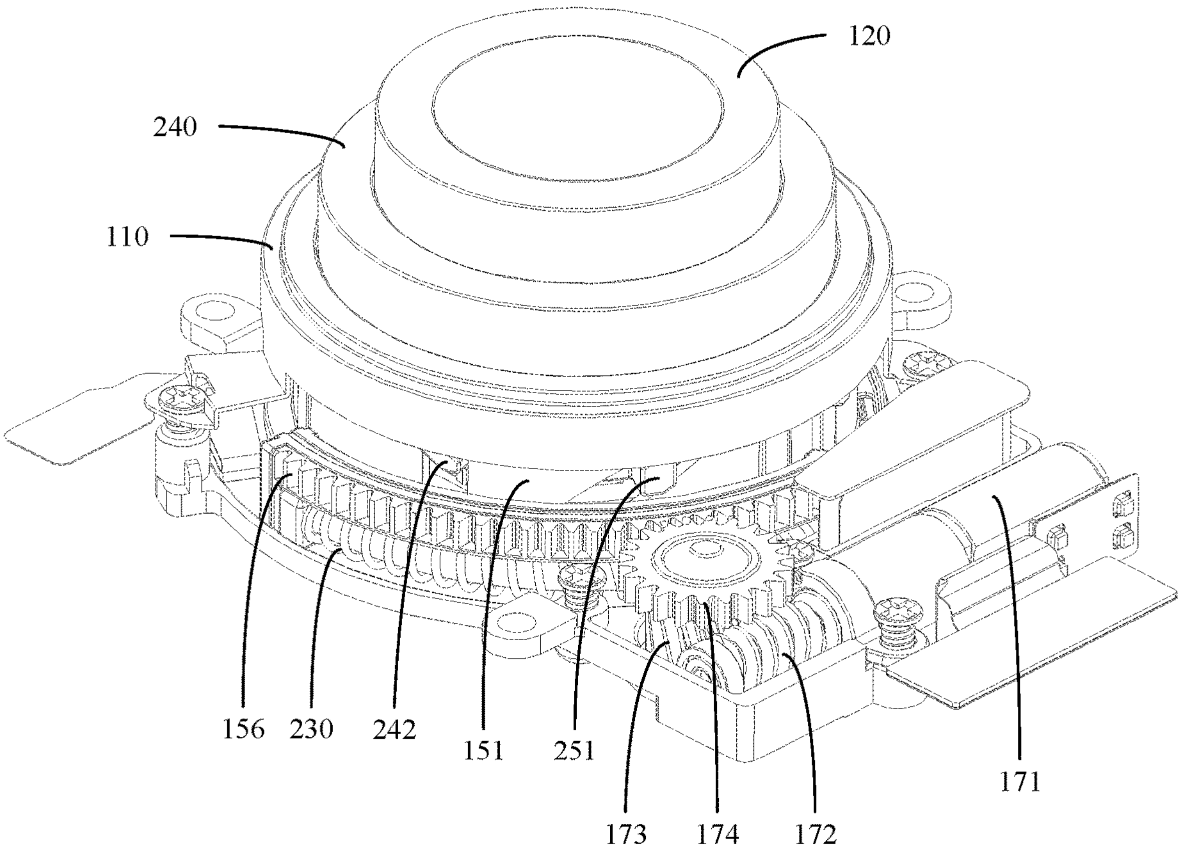
FIG. 1 is a schematic diagram of a partial structure of a camera module disclosed in a first embodiment of this application.
Figure 2:
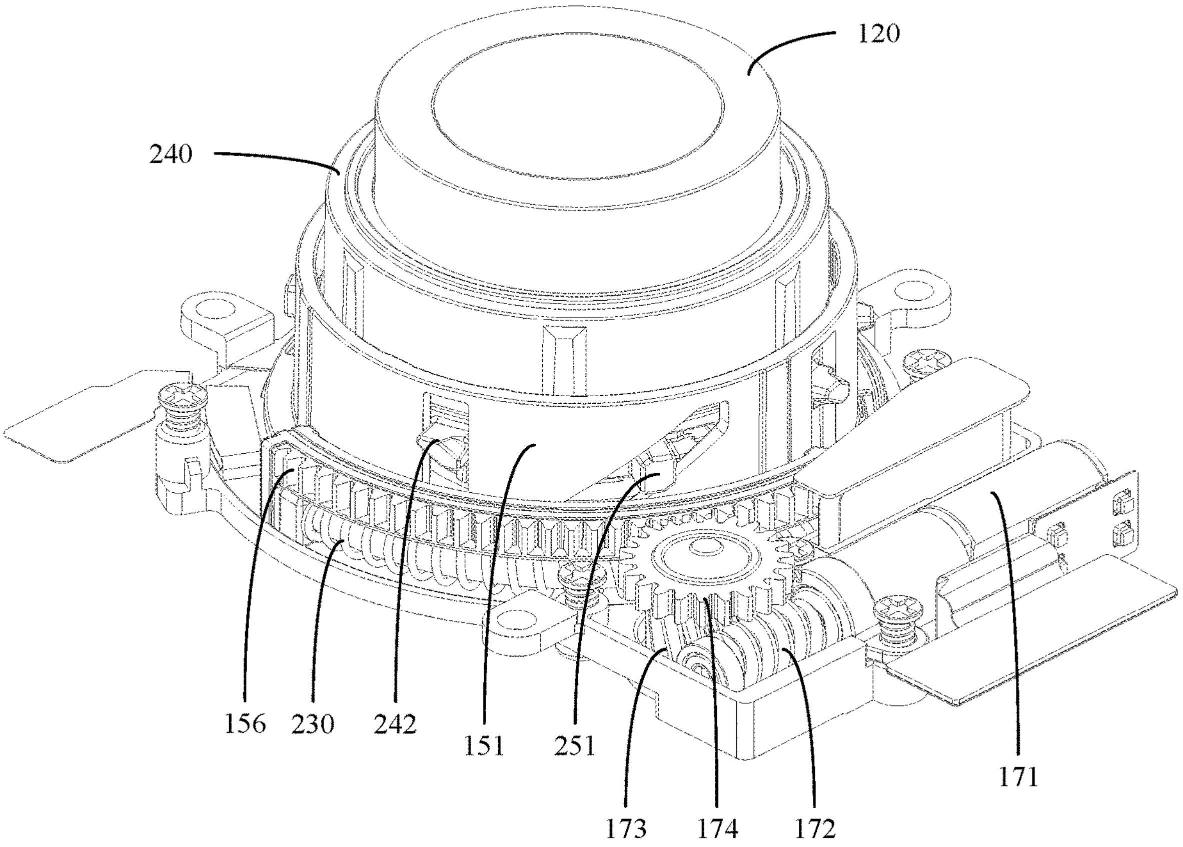
FIG. 2 is a schematic diagram of a structure shown in FIG. 1 with a base removed.
Figure 3:
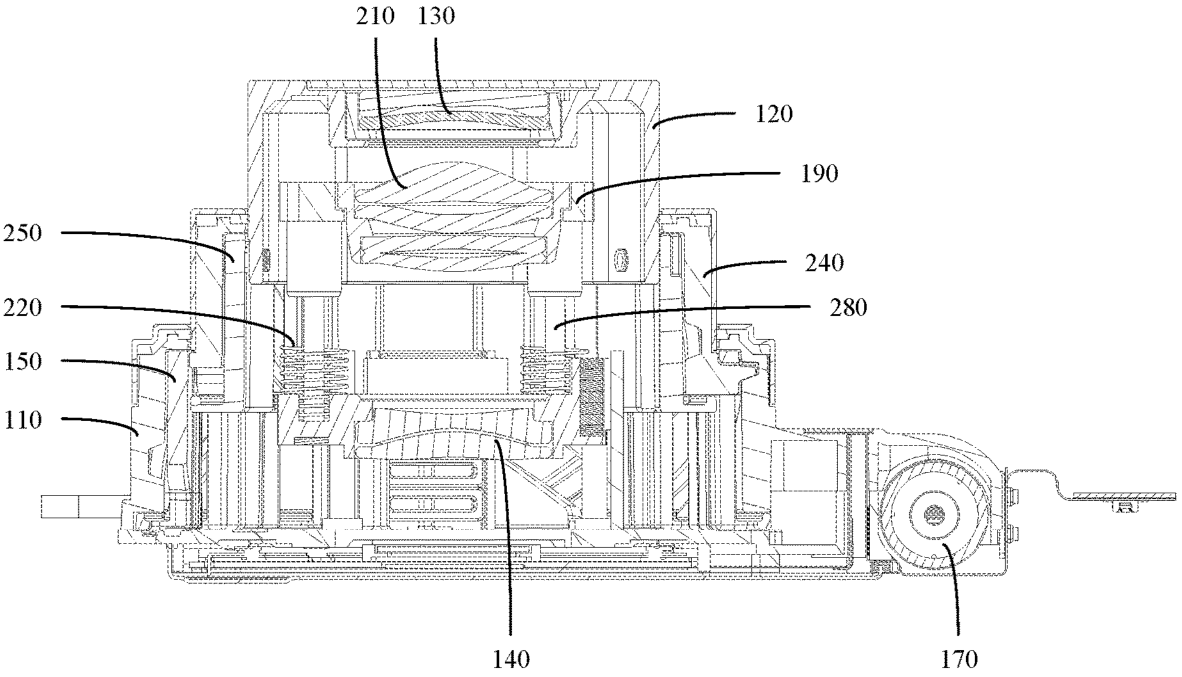
FIG. 3 is a cross-sectional view of a camera module disclosed in a first embodiment of this application.
Figure 4:
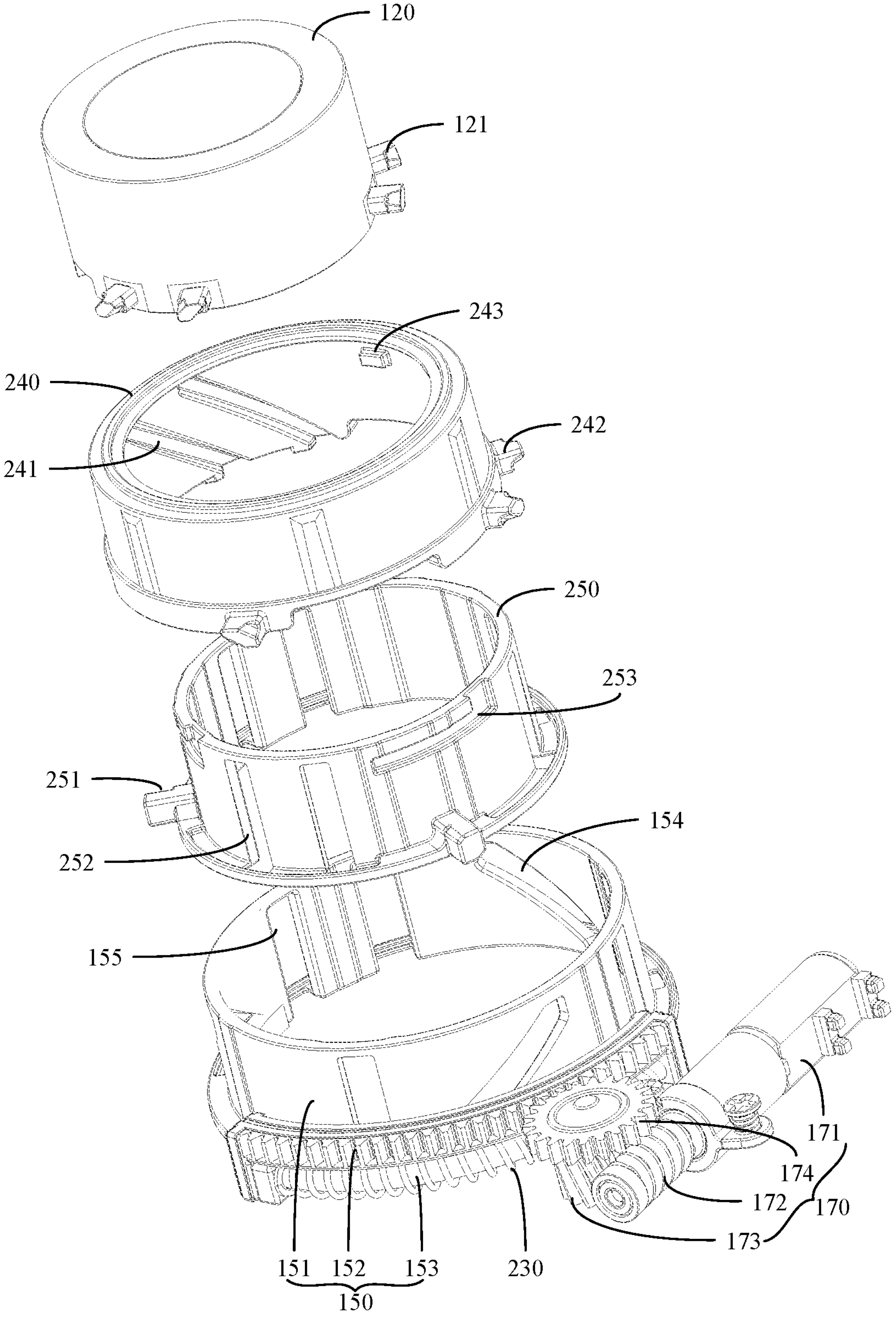
FIG. 4 is an exploded view of a partial structure of a camera module disclosed in a first embodiment of this application.

110—base, 111—bottom plate, 120—first lens barrel, 121—first fitting convex portion, 130—first lens, 140—second lens, 150—active lens barrel, 151—main body member, 152—transmission member, 153—mounting member, 154—second spiral guide groove, 155—first driving groove, 156—rack portion, 160—first bracket, 161—first guide portion, 170—first driving mechanism, 171—driving source, 172—worm, 173—worm gear, 174—transmission wheel, 180—second driving mechanism, 181—driving coil, 182—driving magnet, 183—reinforcing plate, 190—second bracket, 191—second guide portion, 192—extending portion, 210—third lens, 220—first elastic member, 230—second elastic member, 240—second lens barrel, 241—first spiral guide groove, 242—first driving convex portion, 243—second driving convex portion, 250—driven lens barrel, 251—second fitting convex portion, 252—first limiting straight groove, 253—second driving groove, 260—electrical connector, 270—first guide rod, and 280—second guide rod.

DETAILED DESCRIPTION

The technical solutions in embodiments of this application are clearly described below with reference to the accompanying drawings in embodiments of this application. Apparently, the described embodiments are merely some rather than all of the embodiments of this application. All other embodiments obtained by a person skilled in the art based on embodiments of this application without creative efforts shall fall within the protection scope of this application.

The specification and claims of this application, and terms "first" and "second" are used to distinguish similar objects, but are unnecessarily used to describe a specific sequence or order. It may be understood that the data used in such a way is interchangeable in proper circumstances, so that the embodiments of this application can be implemented in other sequences than the sequence illustrated or described herein. In addition, in the specification and claims, "and/or" means at least one of the connected objects, and the character "/" generally indicates an "or" relationship between associated objects.

An electronic device provided in embodiments of this application is described in detail below by using specific embodiments and application scenarios with reference to the accompanying drawings.

Refer to FIG. 1 to FIG. 6, embodiments of this application disclose a camera module, including a base 110, a photosensitive chip, a first lens barrel 120, a first lens 130, a second lens 140, an active lens barrel 150, a first bracket 160, a first driving mechanism 170, and a second driving mechanism 180.

The photosensitive chip is arranged on the base 110. In addition to the photosensitive chip, other components of the camera module may be further arranged on the base 110. The active lens barrel 150 is rotatably connected to the base 110, the first lens barrel 120 is sleeved on the active lens barrel 150, the first lens barrel 120 is connected to the active lens barrel 150 through a first fitting convex portion 121 and a first spiral guide groove 241. Optionally, the first fitting convex portion 121 is arranged on one of the active lens barrel 150 and the first lens barrel 120, and the first spiral guide groove 241 is provided on the other of the active lens barrel 150 and the first lens barrel 120, so that the first lens barrel 120 may be directly driven to extend and contract through the active lens barrel 150. The first bracket 160 is movably arranged on the base 110, the first lens 130 is arranged on the first lens barrel 120, the second lens 140 is arranged on the first bracket 160, the second lens 140 is located between the photosensitive chip and the first lens 130, and the photosensitive chip may be configured to receive light passing through the first lens 130 and the second lens 140, and finally convert a light signal into a digital image signal, to obtain an image.

The first driving mechanism 170 is connected to the active lens barrel 150, the first driving mechanism 170 drives, through the active lens barrel 150, the first lens barrel 120 to move in a first direction through fitting between the first fitting convex portion 121 and the first spiral guide groove 241, the second driving mechanism 180 is connected to the first bracket 160, the second driving mechanism 180 drives the first bracket 160 to move in the first direction, and the first direction is a direction close to or away from the photosensitive chip. In other words, the first driving mechanism 170 may drive the first lens 130 to be close to the photosensitive chip and away from the photosensitive chip, thereby changing a distance between the first lens 130 and the photosensitive chip; and the second driving mechanism 180 may drive the second lens 140 to be close to the photosensitive chip and away from the photosensitive chip, thereby changing a distance between the second lens 140 and the photosensitive chip. Optionally, the first driving mechanism 170 may output a rotational driving force, and may include components such as a motor; and the second driving mechanism 180 may output a telescopic driving force, and may include components such as a telescopic cylinder.

Optionally, the first driving mechanism 170 may include a driving source 171, a worm 172, a worm gear 173, and a transmission wheel 174, a rack portion 156 may be arranged on the active lens barrel 150, and an output shaft of the driving source 171 is coaxially arranged with the worm 172. Therefore, the driving source 171 may drive the worm 172 to rotate, and the worm 172 meshes with the worm gear 173. Therefore, the worm 172 may drive the worm gear 173 to rotate, and the worm gear 173 meshes with the transmission wheel 174. Therefore, the worm gear 173 may drive the transmission wheel 174 to rotate, and the transmission wheel 174 meshes with the rack portion 156, to drive the active lens barrel 150 to rotate through the rack portion 156. The first driving mechanism 170 has advantages such as a simple structure, a high transmission precision, and a long service life.

In embodiments of this application, the first driving mechanism 170 may drive, through the active lens barrel 150, the first lens barrel 120 to move through fitting between the first fitting convex portion 121 and the first spiral guide groove 241, thereby making the first lens 130 close to or away from the photosensitive chip. The second driving mechanism 180 may drive the first bracket 160 to move, thereby making the second lens 140 close to or away from the photosensitive chip, and implementing zooming of the camera module. The camera module may implement a better zooming effect through the movement of the first lens 130 and the second lens 140. In addition, the first driving mechanism 170 and the second driving mechanism 180 may respectively drive the first lens 130 and the second lens 140 to move. Therefore, an overly complex multi-level telescopic structure does not need to be arranged on the first lens 130 and the second lens 140, and this embodiment may reduce difficulty in structural design of the camera module.

The first driving mechanism 170 and the second driving mechanism 180 may simultaneously work, or may work one after another. When the first driving mechanism 170 and the second driving mechanism 180 simultaneously work, positions of the first lens 130 and the second lens 140 may simultaneously change, so that the camera module more quickly switches to a target state, thereby implementing fast zooming.

Optionally, in this embodiment, the second driving mechanism 180 includes a driving coil 181 and a driving magnet 182, the driving coil 181 is arranged on one of the base 110 and the first bracket 160, the driving magnet 182 is arranged on the other of the base 110 and the first bracket 160, and when the driving coil 181 interacts with the driving magnet 182, the first bracket 160 moves in the first direction. Optionally, the base 110 may include a bottom plate 111, and one of the driving coil 181 and the driving magnet 182 may be arranged on the bottom plate 111. In addition, the second driving mechanism 180 may further include a reinforcing plate 183, the reinforcing plate 183 is arranged on one of the base 110 and the first bracket 160, and the driving coil 181 is arranged on the reinforcing plate 183, thereby improving structural stability of the driving coil 181. When the driving coil 181 is energized, the driving coil 181 generates a magnetic field, and the magnetic field interacts with the magnetic field of the driving magnet 182, to generate an Ampere force, so that the driving coil 181 and the driving magnet 182 move relative to each other. By accurately controlling a current applied to the driving coil 181, a movement amount of the first bracket 160 may be accurately controlled, thereby accurately controlling a zoom factor of the camera module. Because the driving coil 181 does not need to contact the driving magnet 182 to implement driving of the second lens 140, the second driving mechanism 180 has a small wear amount and a longer service life, and locations of the driving coil 181 and the driving magnet 182 may be flexibly selected, which facilitates the structural design of the camera module. In addition, the driving coil 181 and the driving magnet 182 occupy less space and have simpler structures, which is more conducive to miniaturization design of the camera module.

Figure 7:
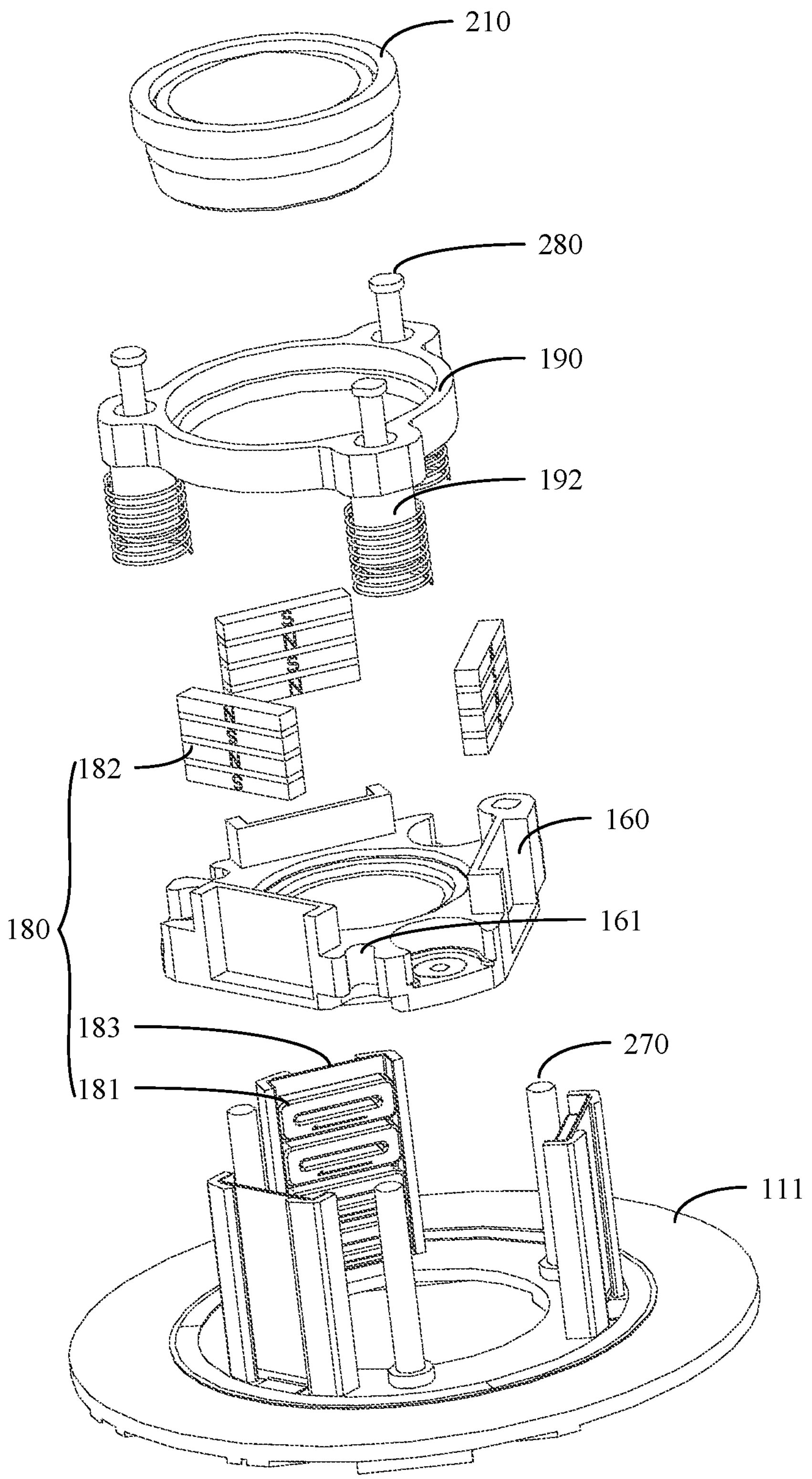
FIG. 7 is an exploded view of a partial structure of a camera module disclosed in a second embodiment of this application.
Figure 8:
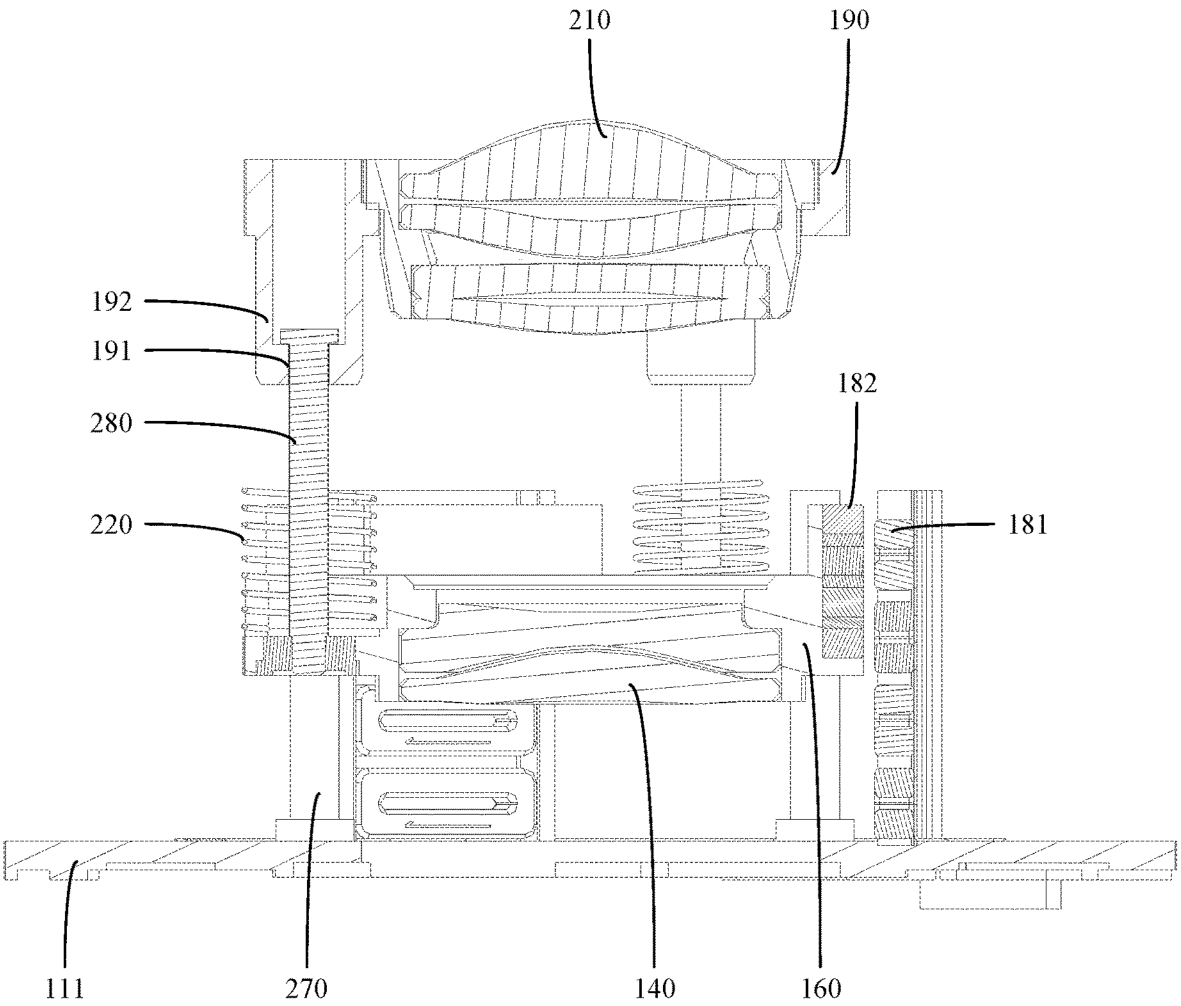
FIG. 8 is a cross-sectional view of a partial structure of a camera module disclosed in a second embodiment of this application.

As shown in FIG. 7 and FIG. 8, in one embodiment, the driving coil 181 is arranged on the base 110, and the driving magnet 182 is arranged on the first bracket 160. When a direction of the magnetic field generated by the driving coil 181 is the same as a direction of the magnetic field of the driving magnet 182, the driving magnet 182 moves away from the driving coil 181, thereby driving the second lens 140 to be away from the photosensitive chip through the first bracket 160; and when a direction of the magnetic field generated by the driving coil 181 is opposite to a direction of the magnetic field of the driving magnet 182, the driving magnet 182 is close to the driving coil 181, thereby driving the second lens 140 to be close to the photosensitive chip through the first bracket 160. In this embodiment, the driving coil 181 may be fixed, thereby facilitating electrical connection design of the driving coil 181.

Figure 5:
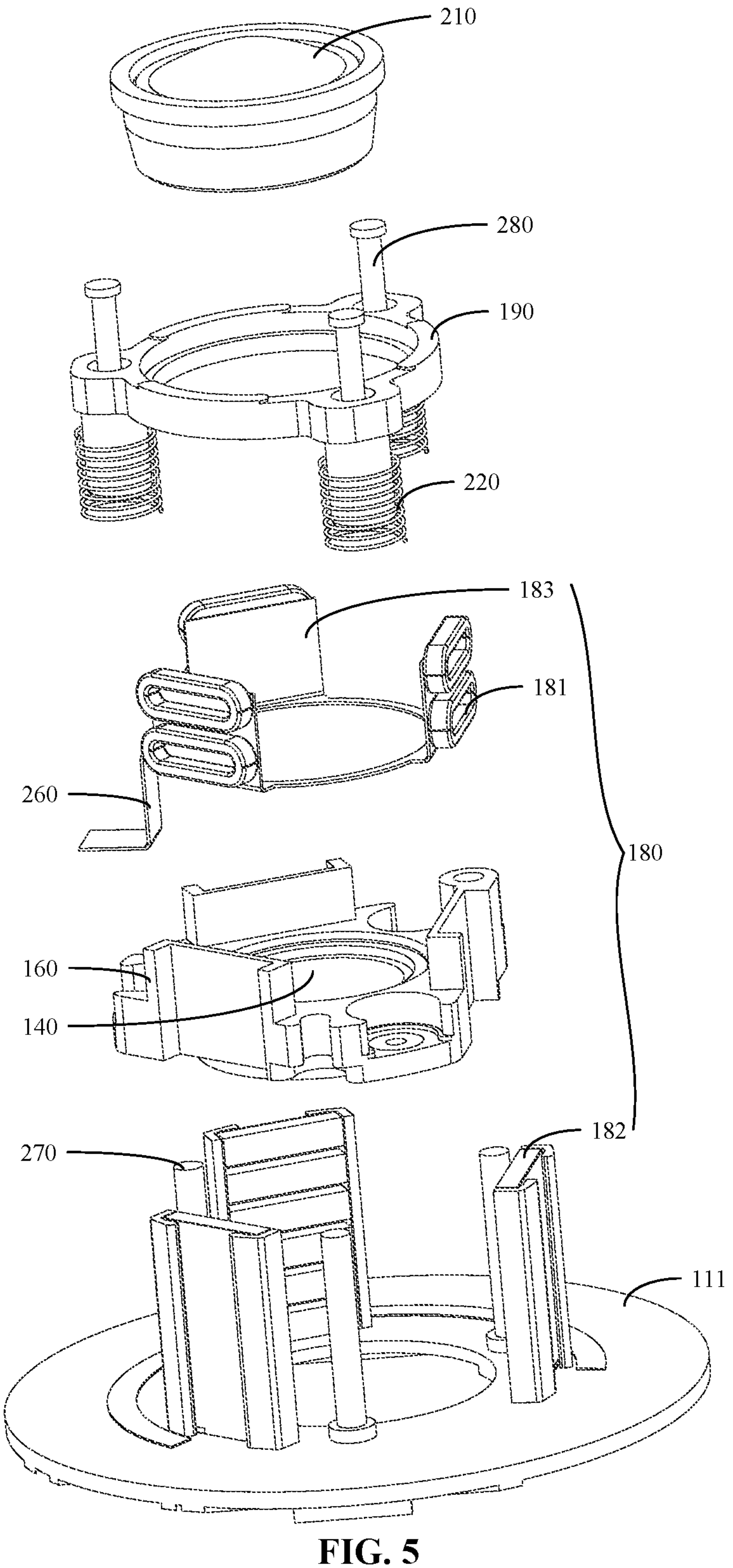
FIG. 5 is an exploded view of another partial structure of a camera module disclosed in a first embodiment of this application.
Figure 6:
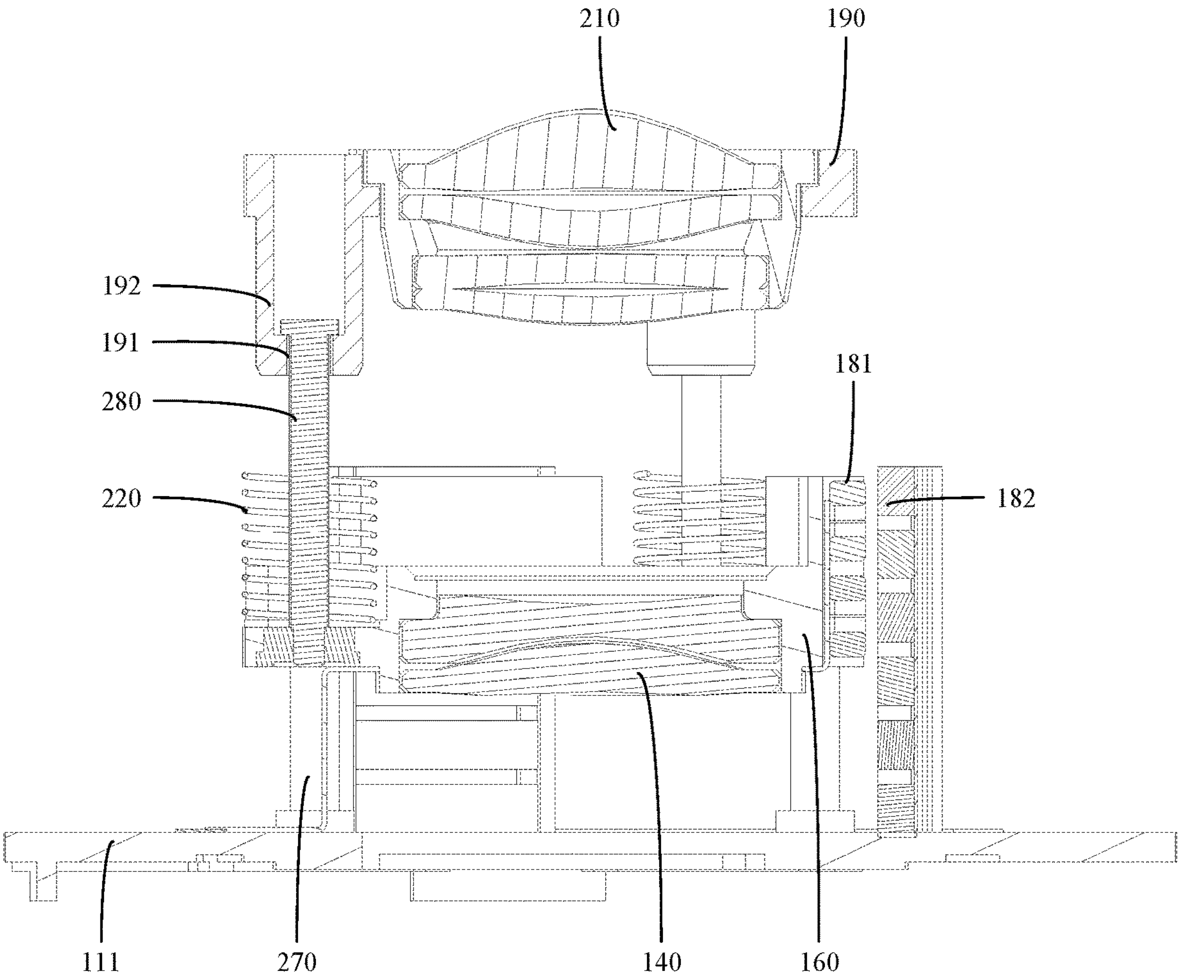
FIG. 6 is a cross-sectional view of a partial structure of a camera module disclosed in a first embodiment of this application.

As shown in FIG. 5 and FIG. 6, in another embodiment, the driving magnet 182 is arranged on the base 110, and the driving coil 181 is arranged on the first bracket 160. When a direction of the magnetic field generated by the driving coil 181 is the same as a direction of the magnetic field of the driving magnet 182, the driving coil 181 moves away from the driving magnet 182, thereby driving the second lens 140 to be away from the photosensitive chip through the first bracket 160; and when a direction of the magnetic field generated by the driving coil 181 is opposite to a direction of the magnetic field of the driving magnet 182, the driving coil 181 is close to the driving magnet 182, thereby driving the second lens 140 to be close to the photosensitive chip through the first bracket 160. In this embodiment, the driving magnet 182 is fixed. Because the driving coil 181 is usually lighter than the driving magnet 182, a driving force required by the driving coil 181 is smaller, and power consumption of the camera module is subsequently reduced.

To provide a greater driving force, a quantity of driving coils 181 may be set to at least two, and a quantity of driving magnets 182 may be correspondingly set to at least two. Each driving coil 181 and each driving magnet 182 are arranged around an optical axis, and each driving coil 181 may work in one-to-one correspondence with each driving magnet 182, thereby providing a greater and more widely distributed force, so that the first bracket 160 may move more smoothly. Further, each driving coil 181 is connected to the electrical connector 260. In other words, all driving coils 181 are correspondingly connected to the electrical connector 260, so that all driving coils 181 may generate magnetic fields, thereby generating a greater driving force. Optionally, the electrical connector 260 may be a flexible circuit board.

To expand a zoom range of the camera module, the camera module may further include a second bracket 190 and a third lens 210, the second bracket 190 is movably arranged on the first bracket 160, the third lens 210 is arranged on the second bracket 190, and the third lens 210 is located between the first lens 130 and the second lens 140. Optionally, a third driving mechanism may be arranged on the first bracket 160, and the third driving mechanism includes a telescopic cylinder or a coil magnet component. Other driving schemes may be further used, provided that the second bracket 190 may be driven to move relative to the first bracket 160. Because a distance between the third lens 210 and the first lens 130 and a distance between the third lens 210 and the second lens 140 may vary, more zoom factors may be obtained through movement of the third lens 210.

It should be noted that a quantity of first lenses 130, a quantity of second lenses 140, and a quantity of third lenses 210 each may be one, or each may be at least two, and a specific quantity of the three may be determined according to an imaging requirement of the camera module. This is not limited in embodiments of this application.

In another optional embodiment, the camera module further includes a first elastic member 220, the first elastic member 220 is arranged between the first bracket 160 and the second bracket 190, and the second driving mechanism 180 drives the second bracket 190 to move in a first direction through the first bracket 160 and the first elastic member 220. In a case that the second bracket 190 is subject to an external force, the first elastic member 220 causes the second bracket 190 to move in a direction close to the photosensitive chip. When the second driving mechanism 180 applies a force to the first bracket 160, and when the first bracket 160 moves, the first elastic member 220 may drive the second bracket 190 to move, thereby implementing synchronous movement of the second lens 140 and the third lens 210. When the second bracket 190 is subject to an external force, the first elastic member 220 may deform, to buffer the external force, and prevent components such as the first bracket 160 and the second bracket 190 from being damaged due to the external force. In addition, the first elastic member 220 may allow the second bracket 190 to move relative to the first bracket 160. Therefore, a distance between the third lens 210 and the second lens 140 may be changed, to implement zooming. The zooming scheme has advantages such as a simple structure.

To improve stability of the movement of the first bracket 160, the camera module further includes a first guide rod 270, a first guide portion 161 is arranged on one of the base 110 and the first bracket 160, the other of the base 110 and the first bracket 160 is fixedly connected to the first guide rod 270, and the first guide portion 161 slide-fits the first guide rod 270. In this embodiment, the first guide rod 270 may limit lateral movement of the first bracket 160, thereby providing a guide for the movement of the first bracket 160, and making the first bracket 160 move more smoothly. Further, a plurality of first guide rods 270 may be arranged, and the plurality of first guide rods 270 fits with a plurality of first guide portions 161 in one-to-one correspondence, thereby optimizing a guide effect.

To improve stability of the movement of the second bracket 190, the camera module further includes a second guide rod 280, a second guide portion 191 is arranged on one of the first bracket 160 and the second bracket 190, the other of the first bracket 160 and the second bracket 190 is fixedly connected to the second guide rod 280, and the second guide portion 191 slide-fits the second guide rod 280. In this embodiment, the second guide rod 280 may limit lateral movement of the second bracket 190, thereby providing a guide for the movement of the first bracket 190, and making the second bracket 160 move more smoothly. Further, a plurality of second guide rods 280 may be arranged, and the plurality of second guide rods 280 fits with a plurality of second guide portions 191 in one-to-one correspondence, thereby optimizing a guide effect.

Both the first guide portion 161 and the second guide portion 191 may be configured as guide holes. In other embodiments, the first guide portion 161 is arranged on an edge of the first bracket 160, the first guide portion 161 is a guide notch, the second guide portion 191 is arranged on an edge of the second bracket 190, and the second guide portion 191 is a guide hole. Because the first bracket 160 needs to be connected to both the base 110 and the second bracket 190, a structural strength of the first bracket 160 has a greater impact on a service life of the camera module, and the guide notch may meet a guide requirement, and also reduce a material removal amount of the first bracket 160, to improve the structural strength of the first bracket 160. The second bracket 190 is mainly connected to the first bracket 160. Therefore, a structural strength of the second bracket 160 has little impact on the service life of the camera module. The second guide portion 191 is configured as a guide hole, which does not cause the structural strength of the second guide portion 191 to be too small, and may increase a contact area between the second guide portion 191 and the second guide rod 280, thereby improving a guide effect.

A connection position between the first elastic member 220 and the second bracket 190 may be staggered from a position of the second guide portion 191. However, such arrangement causes a structure of the second bracket 190 to be not compact enough, and increases difficulty in structural design of the second bracket 190. Therefore, an extending portion 192 is arranged on a surface of the second bracket 190 facing the first bracket 160, the second guide portion 191 is arranged on the extending portion 192, and the extending portion 192 is at least partially extendable into the first elastic member 220. In this embodiment, the extending portion 192 may be used as a connecting part between the second bracket 190 and the first elastic member 220. After at least a part of the extending portion 192 extends into the first elastic member 220, the extending portion 192 may assist in limiting lateral deformation of the first elastic member 220, which is more conducive to extending a service life of the first elastic member 220. Because the extending portion 192 and the second guide portion 191 are integrated together, the structure of the second bracket 190 is more compact, and difficulty in structural design of the second bracket 190 is lower. In addition, the second bracket 190 is not prone to occupy space of other components, which is more conducive to overall layout of the camera module.

Further, optionally, a counter bore is provided on the extending portion 192, and the second guide portion 191 may be arranged on a bottom surface of the counter bore. Compared with the scheme in which the second guide portion 191 penetrates the entire extending portion 192, in this embodiment, the second guide portion 191 only penetrates a part of the extending portion 192, and an end of the second guide rod 280 away from the first bracket 160 may be closer to the first bracket 160, so that the first bracket 160 and the second bracket 190 are distributed more compactly, which is conducive to miniaturization design of the camera module.

Optionally, the camera module further includes a second elastic member 230, the active lens barrel 150 includes a main body member 151 and a transmission member 152 that are separately arranged, a first end of the second elastic member 230 is connected to the main body member 151, a second end of the second elastic member 230 is connected to the transmission member 152, and the first driving mechanism 170 is connected to the transmission member 152. Optionally, a rack portion 156 may be arranged on the transmission member 152, and the first driving mechanism 170 may drive the transmission member 152 to rotate through the rack portion 156. When zooming needs to be performed, the first driving mechanism 170 drives the first lens barrel 120 to move in the first direction through the transmission member 152, the second elastic member 230, and the main body member 151 in sequence. In a case that the first lens barrel 120 is subject to an external force, the second elastic member 230 causes the first lens barrel 120 to move in the direction close to the photosensitive chip. Because the main body member 151 and the transmission member 152 are separately arranged, movement of the main body member 151 and the transmission member 152 may be separated. In other words, the transmission member 152 may transmit a driving force to the main body member 151 through the second elastic member 230, to cause the main body member 151 to rotate. When the transmission member 152 does not transmit the driving force to the main body member 151, the main body member 151 may rotate relative to the transmission member 152 under an action of an external force.

After using the foregoing structure, when the first lens barrel 120 is in an extending state, once the first lens barrel 120 is subject to the external force, the first lens barrel 120 tends to retract. In this case, although the first driving mechanism 170 does not work, due to existence of the second elastic member 230, the first lens barrel 120 may still move. In other words, in a case that the first lens barrel 120 is subject to the external force, the second elastic member 230 causes the first lens barrel 120 to move in a direction close to the photosensitive chip. When the external force on the first lens barrel 120 disappears, the second elastic member 230 recovers from deformation, thereby driving the first lens barrel 120 to return to the extended state through the main body member 151, so that the camera module may continue to work with the first lens barrel 120 extending, without the need to re-drive the first lens barrel 120 to extend through the first driving mechanism 170. It may be learnt that the second elastic member 230 may convert dynamic potential energy generated when the camera module is pressed due to falling, collision, artificial pressing, and the like into elastic potential energy of the second elastic member 230, thereby achieving a buffering effect. Therefore, the first fitting convex portion 121 is not easily broken due to extrusion, and other components of the camera module are not easily affected by an impact force. Therefore, this embodiment may extend a service life of the camera module.

When both the first elastic member 220 and the second elastic member 230 are arranged on the camera module, once the first lens barrel 120 is subject to an external force, the first lens barrel 120 is close to the photosensitive chip under the action of the second elastic member 230. In a case that the first lens barrel 120 contacts the second bracket 190, the first lens barrel 120 presses the second bracket 190, and the second bracket 190 is close to the photosensitive chip under the action of the first elastic member 220. When the external force on the first lens barrel 120 disappears, the first elastic member 220 and the second elastic member 230 simultaneously perform a reset function, so that the first lens barrel 120 and the second bracket 190 move away from the photosensitive chip. When the second bracket 190 reaches an extreme position, the first lens barrel 120 continues to move away from the photosensitive chip until the first lens barrel 120 reaches the extreme position.

In an optional embodiment, the transmission member 152 has a third end and a fourth end, and there is a gap between the third end and the fourth end. In other words, the transmission member 152 is not a closed annular structure, but an arc-shaped component with a notch. Due to the existence of the notch, the second elastic member 230 is sleeved on the transmission member 152 through the notch. In this embodiment, the transmission member 152 uses a rod-shaped component with a relatively simple structure, and the second elastic member 230 may be directly sleeved on the transmission member 152. Therefore, this embodiment may simplify a structure and assembly of the camera module, reduce a processing cost of the camera module, and cause the camera module to have more space to accommodate other components.

In another optional embodiment, the active lens barrel 150 further includes a mounting member 153. The mounting member 153 and the transmission member 152 are separately arranged, and the mounting member 153 is connected to the transmission member 152. The second elastic member 230 is sleeved on the mounting member 153, and the transmission member 152 is an annular member. In this embodiment, a second end of the second elastic member 230 is connected to the transmission member 152 through the mounting member 153. Because the second elastic member 230 may be mounted through the mounting member 153 that is additionally arranged, structural design of the second elastic member 230 is not easily limited by the transmission member 152. Therefore, the second elastic member 230 may be arranged more flexibly, so that the second elastic member 230 has a stronger capability to absorb the external force. Optionally, the mounting member 153 may be an arc-shaped and rod-shaped component, thereby facilitating mounting of the second elastic member 230. In addition, the transmission member 152 is an annular member, which makes the camera module more stable during telescopic movement. In addition, the annular transmission member 152 has a higher structural strength, which is not only conducive to transmitting a driving force, but also may help withstand the force exerted by the second elastic member 230, preventing the part of the force from causing damage to the transmission member 152 and the first driving mechanism 170.

As mentioned above, the active lens barrel 150 may directly drive the first lens barrel 120. In other embodiments, the camera module further includes a second lens barrel 240, the second lens barrel 240 is sleeved on the active lens barrel 150, the first lens barrel 120 is sleeved on the second lens barrel 240, the first spiral guide groove 241 is provided on one of the first lens barrel 120 and the second lens barrel 240, and the first fitting convex portion 121 is arranged on the other of the first lens barrel 120 and the second lens barrel 240. In this embodiment, both the first lens barrel 120 and the second lens barrel 240 may move in a first direction. Therefore, a position change range of the first lens 130 relative to the photosensitive chip is greater, thereby improving a zooming effect of the camera module.

Optionally, a straight groove may be provided on the base 110, to limit rotation of the first lens barrel 120, so that the first lens barrel 120 only moves in the first direction. However, in this embodiment, a moving distance of the first lens barrel 120 is limited by the base 110. Therefore, in another embodiment, the camera module further includes a driven lens barrel 250, the driven lens barrel 250 is connected to the active lens barrel 150, the second lens barrel 240 is sleeved outside the driven lens barrel 250, a second fitting convex portion 251 is arranged on the driven lens barrel 250, a second spiral guide groove 154 is provided on the active lens barrel 150, and the driven lens barrel 250 is movable along with fitting between the second fitting convex portion 251 and the second spiral guide groove 154. A first limiting straight groove 252 extending in a first direction is provided on the driven lens barrel 250, a first fitting convex portion 121 is arranged on the first lens barrel 120, an end of the first fitting convex portion 121 passes through the first spiral guide groove 241 and fits with the first limiting straight groove 252. In addition, a second limiting straight groove extending in the first direction is provided on the base 110, and an end of the second fitting convex portion 251 passes through the second spiral guide groove 154 and fits with the second limiting straight groove, thereby limiting rotation of the driven lens barrel 250. The driven lens barrel 250 may limit rotation of the first lens barrel 120 through the first limiting straight groove 252. Because the driven lens barrel 250 may move to a position higher than the base 110, the driven lens barrel 250 is not prone to limit a movement distance of the first lens barrel 120, thereby improving a zooming effect of the camera module.

Movement of the second lens barrel 240 may also be implemented by fitting between the fitting convex portion and the spiral guide groove. However, to simplify the structure of the camera module, a first driving groove 155 extending in the first direction is provided on the active lens barrel 150. A first driving convex portion 242 is arranged on the second lens barrel 240, and the first driving convex portion 242 fits with the first driving groove 155. In addition, a second driving groove 253 extending in a circumferential direction of the driven lens barrel 250 is provided on the driven lens barrel 250, a second driving convex portion 243 is arranged on the second lens barrel 240, and the second driving convex portion 243 fits with the second driving groove 253. When the active lens barrel 150 rotates, on one hand, the active lens barrel 150 may drive the driven lens barrel 250 to move in the first direction, and on the other hand, the active lens barrel 150 may drive the second lens barrel 240 to rotate. When the driven lens barrel 250 moves in the first direction, the driven lens barrel 250 drives the second lens barrel 240 to move in the first direction through fitting between the second driving convex portion 243 and the second driving groove 253, thereby implementing movement and rotation of the second lens barrel 240, so that the second lens barrel 240 drives the first lens barrel 120 to move. In this embodiment, a spiral guide groove is not required to implement movement of the second lens barrel 240. Therefore, the structure of the camera module may be simplified.

Further, the second driving groove 253 may be configured as an L-shaped groove, so that one end of the second driving groove 253 extends toward an edge of the driven lens barrel 250, to facilitate the second lens barrel 240 to be assembled with the driven lens barrel 250.

Further, because the camera module respectively drives the first lens 130 and the second lens 140 to move through the first driving mechanism 170 and the second driving mechanism 180, a better zooming effect may be implemented. Therefore, the first spiral guide groove 241 may be configured as a linear guide groove, thereby making a structure of the first spiral guide groove 241 simpler. Similarly, the second spiral guide groove 154 is a linear guide groove, so that a structure of the second spiral guide groove 154 is simpler.

The first fitting convex portion 121 may be configured as a cylindrical protrusion, but a fitting area between the cylindrical convex portion and the first spiral guide groove 241 is small, causing the first fitting convex portion 121 and the first spiral guide groove 241 to be easily worn. Therefore, in other embodiments, a first fitting surface is arranged on the first fitting convex portion 121, and the first fitting surface is attached to an inner wall of the first spiral guide groove 241. In this case, the first fitting convex portion 121 contacts a surface of the first spiral guide groove 241, and a fitting area between the first fitting convex portion 121 and the first spiral guide groove 241 is greater, thereby reducing a wear amount of the first fitting convex portion 121 and the first spiral guide groove 241. In addition, the structure may further improve a structural strength of the first fitting convex portion 121 and a structural strength of the first spiral guide groove 241.

Similarly, a second fitting surface is arranged on the second fitting convex portion 251, and the second fitting surface is attached to an inner wall of the second spiral guide groove 154. Compared with the circular second fitting convex portion 251, the first fitting convex portion 121 provided with the second fitting surface contacts the surface of the first spiral guide groove 241, and a fitting area between the first fitting convex portion 121 and the first spiral guide groove 241 is greater, thereby reducing a wear amount of the second fitting convex portion 251 and the second spiral guide groove 154.

Embodiments of this application further disclose an electronic device. The electronic device includes the camera module in any of the foregoing embodiments.

The electronic device disclosed in embodiments of this application may be an electronic device such as a smartphone, a tablet computer, an e-book reader, a wearable device (such as a smart watch), an electronic game console, or the like. A type of the electronic device is not specifically limited in embodiments of this application.

Although embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

The invention claimed is:

1. A camera module, comprising: a base, a photosensitive chip, a first lens barrel, a first lens, a second lens, an active lens barrel, a first bracket, a first driving mechanism, and a second driving mechanism, wherein the photosensitive chip is arranged on the base, the active lens barrel is rotatably connected to the base, the first lens barrel is sleeved on the active lens barrel, the first lens barrel is connected to the active lens barrel through a first fitting convex portion and a first spiral guide groove, the first bracket is movably arranged on the base, the first lens is arranged on the first lens barrel, the second lens is arranged on the first bracket, and the second lens is located between the photosensitive chip and the first lens, and the first driving mechanism is connected to the active lens barrel, the first driving mechanism drives, through the active lens barrel, the first lens barrel to move in a first direction through fitting between the first fitting convex portion and the first spiral guide groove, the second driving mechanism is connected to the first bracket, the second driving mechanism drives the first bracket to move in the first direction, and the first direction is a direction close to or away from the photosensitive chip;

wherein the camera module further comprises a second bracket and a third lens, the second bracket is movably arranged on the first bracket, the third lens is arranged on the second bracket, and the third lens is located between the first lens and the second lens.

2. The camera module according to claim 1, wherein the second driving mechanism comprises a driving coil and a driving magnet, the driving coil is arranged on one of the base and the first bracket, the driving magnet is arranged on the other of the base and the first bracket, and when the driving coil interacts with the driving magnet, the first bracket moves in the first direction.

3. The camera module according to claim 2, wherein a quantity of driving coils is at least two, and each of the driving coils is connected to an electrical connector.

4. The camera module according to claim 1, wherein the camera module further comprises a first elastic member, and the first elastic member is arranged between the first bracket and the second bracket, the second driving mechanism drives the second bracket to move in the first direction through the first bracket and the first elastic member, and in a case that the second bracket is subject to an external force, the first elastic member causes the second bracket to move in the direction close to the photosensitive chip.

5. The camera module according to claim 4, wherein the camera module further comprises a first guide rod, a first guide portion is arranged on one of the base and the first bracket, the other of the base and the first bracket is fixedly connected to the first guide rod, and the first guide portion slide-fits the first guide rod, and the camera module further comprises a second guide rod, a second guide portion is arranged on one of the first bracket and the second bracket, the other of the first bracket and the second bracket is fixedly connected to the second guide rod, and the second guide portion slide-fits the second guide rod.

6. The camera module according to claim 5, wherein the first guide portion is arranged on an edge of the first bracket, the first guide portion is a guide notch, the second guide portion is arranged on an edge of the second bracket, and the second guide portion is a guide hole.

7. The camera module according to claim 6, wherein an extending portion is arranged on a surface of the second bracket facing the first bracket, the second guide portion is arranged on the extending portion, and the extending portion is at least partially extendable into the first elastic member.

8. The camera module according to claim 1, wherein the camera module further comprises a second elastic member, the active lens barrel comprises a main body member and a transmission member that are separately arranged, a first end of the second elastic member is connected to the main body member, a second end of the second elastic member is connected to the transmission member, and the first driving mechanism is connected to the transmission member, the first driving mechanism drives the first lens barrel to move in the first direction through the transmission member, the second elastic member, and the main body member in sequence, and in a case that the first lens barrel is subject to an external force, the second elastic member causes the first lens barrel to move in the direction close to the photosensitive chip.

9. The camera module according to claim 1, wherein the camera module further comprises a second lens barrel, the second lens barrel is sleeved on the active lens barrel, the first lens barrel is sleeved on the second lens barrel, the first spiral guide groove is provided on one of the first lens barrel and the second lens barrel, and the first fitting convex portion is arranged on the other of the first lens barrel and the second lens barrel.

10. The camera module according to claim 9, wherein the camera module further comprises a driven lens barrel, the driven lens barrel is connected to the active lens barrel, the second lens barrel is sleeved outside the driven lens barrel, a second fitting convex portion is arranged on the driven lens barrel, a second spiral guide groove is provided on the active lens barrel, and the driven lens barrel is movable along with fitting between the second fitting convex portion and the second spiral guide groove, and a first limiting straight groove extending in the first direction is provided on the driven lens barrel, the first fitting convex portion is arranged on the first lens barrel, and one end of the first fitting convex portion passes through the first spiral guide groove and fits with the first limiting straight groove.

11. The camera module according to claim 10, wherein a first driving groove extending in the first direction is provided on the active lens barrel, a first driving convex portion is arranged on the second lens barrel, and the first driving convex portion fits with the first driving groove, and a second driving groove extending in a circumferential direction of the driven lens barrel is provided on the driven lens barrel, a second driving convex portion is arranged on the second lens barrel, and the second driving convex portion fits with the second driving groove.

12. The camera module according to claim 10, wherein both the first spiral guide groove and the second spiral guide groove are linear guide grooves; and/or a first fitting surface is arranged on the first fitting convex portion, and the first fitting surface is attached to an inner wall of the first spiral guide groove; and/or a second fitting surface is arranged on the second fitting convex portion, and the second fitting surface is attached to an inner wall of the second spiral guide groove.

13. An electronic device, comprising a camera module, wherein the camera module comprises: a base, a photosensitive chip, a first lens barrel, a first lens, a second lens, an active lens barrel, a first bracket, a first driving mechanism, and a second driving mechanism, wherein the photosensitive chip is arranged on the base, the active lens barrel is rotatably connected to the base, the first lens barrel is sleeved on the active lens barrel, the first lens barrel is connected to the active lens barrel through a first fitting convex portion and a first spiral guide groove, the first bracket is movably arranged on the base, the first lens is arranged on the first lens barrel, the second lens is arranged on the first bracket, and the second lens is located between the photosensitive chip and the first lens, and the first driving mechanism is connected to the active lens barrel, the first driving mechanism drives, through the active lens barrel, the first lens barrel to move in a first direction through fitting between the first fitting convex portion and the first spiral guide groove, the second driving mechanism is connected to the first bracket, the second driving mechanism drives the first bracket to move in the first direction, and the first direction is a direction close to or away from the photosensitive chip;

wherein the camera module further comprises a second bracket and a third lens, the second bracket is movably arranged on the first bracket, the third lens is arranged on the second bracket, and the third lens is located between the first lens and the second lens.

14. The electronic device according to claim 13, wherein the second driving mechanism comprises a driving coil and a driving magnet, the driving coil is arranged on one of the base and the first bracket, the driving magnet is arranged on the other of the base and the first bracket, and when the driving coil interacts with the driving magnet, the first bracket moves in the first direction.

15. The electronic device according to claim 14, wherein a quantity of driving coils is at least two, and each of the driving coils is connected to an electrical connector.

16. The electronic device according to claim 13, wherein the camera module further comprises a first elastic member, and the first elastic member is arranged between the first bracket and the second bracket, the second driving mechanism drives the second bracket to move in the first direction through the first bracket and the first elastic member, and in a case that the second bracket is subject to an external force, the first elastic member causes the second bracket to move in the direction close to the photosensitive chip.

17. The electronic device according to claim 16, wherein the camera module further comprises a first guide rod, a first guide portion is arranged on one of the base and the first bracket, the other of the base and the first bracket is fixedly connected to the first guide rod, and the first guide portion slide-fits the first guide rod, and the camera module further comprises a second guide rod, a second guide portion is arranged on one of the first bracket and the second bracket, the other of the first bracket and the second bracket is fixedly connected to the second guide rod, and the second guide portion slide-fits the second guide rod.

18. The electronic device according to claim 17, wherein the first guide portion is arranged on an edge of the first bracket, the first guide portion is a guide notch, the second guide portion is arranged on an edge of the second bracket, and the second guide portion is a guide hole.

* * * * *